UNITED STATES PATENT OFFICE.

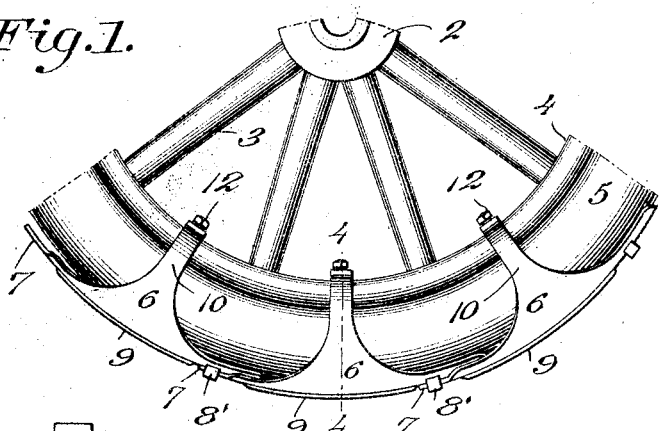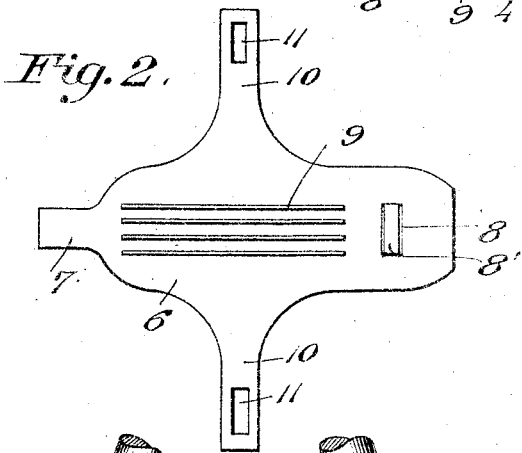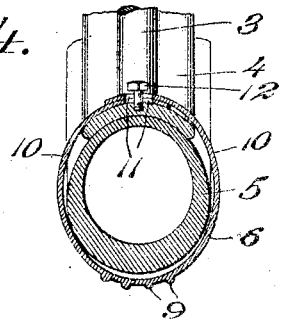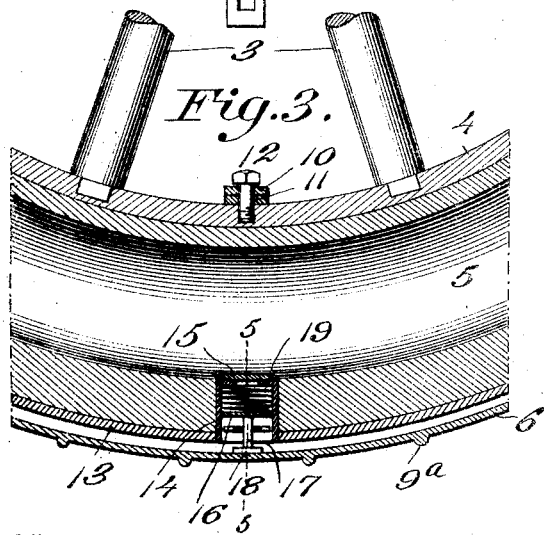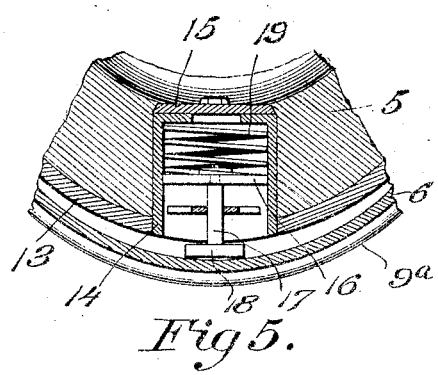

WILLIAM H. RICE, OF BENTON HARBOR, MICHIGAN.

TIRE-PROTECTOR.

No. 906,933.　　　Specification of Letters Patent.　　　Patented Dec. 15, 1908.

Application filed May 26, 1906. Serial No. 318,962.

*To all whom it may concern:*

Be it known that I, WILLIAM H. RICE, a citizen of the United States, residing at Benton Harbor, in the county of Berrien and State of Michigan, have invented new and useful Improvements in Tire-Protectors, of which the following is a specification.

My invention relates to tire protectors, and its primary object is to provide a novel and highly useful device of this character which comprises a plurality of metal sections connected together in a manner to provide in effect a practically integral protector and to permit the sections to have limited relative movements to prevent the protector from detracting from the elastic qualities of the tire.

A further object of the invention is to provide the sections with arms by which they may be secured to a wheel, said arms yielding laterally under the force exerted thereon by the lateral enlargement of that portion of the tire bearing the weight of the wheel, whereby also to prevent the protector from detracting from the elastic qualities of the tire.

A still further object is to provide a protector which will prevent the slippage of the wheel, one which may be applied and removed readily and quickly and one which may be manufactured and sold at a comparatively low cost.

With the above and other objects in view, the invention consists of the construction, combination and arrangement of parts hereinafter fully described, claimed and illustrated in the accompanying drawings, wherein:

Figure 1 is an elevation of fragmentary portions of a wheel, illustrating the application of my improved tire protector. Fig. 2 is a bottom plan of one of the sections of my improved tire protector. Fig. 3 is a vertical central and longitudinal section of the felly and tire of a wheel equipped with my improved tire protector, Fig. 4 is a transverse section on the line 4—4 of Fig. 1. Fig. 5 is a section on the line 5—5 of Fig. 4.

Referring to the drawings by reference numerals, 2 designates the hub, 3 the spokes and 4 the felly of a wheel of the usual construction. A pneumatic tire 5, also of the usual construction, is secured to the felly 4.

My improved tire protector comprises metal sections which are secured to the tire to fully inclose the circumference thereof to prevent the tire from contacting directly with a roadway, thus preventing the tire from wearing and becoming punctured. The sections are curved to snugly fit the tire and comprise tread portions 6, beyond which each section is extended in a longitudinal direction to provide a tongue 7. The tread portions 6 adjacent their opposite ends are provided with pairs of relatively spaced parallel slits 8; and those portions between the slits are bent outwardly to provide keepers 8'.

The tongue 7 of one of the sections overlaps the adjacent end of the next section and is inserted under its keeper 8' to prevent the overlapped portions of the sections yielding radially beyond the tread of the protector. The tongues 7 slidably engage in the keeper 8' to permit the sections to move relatively to prevent the protector from detracting from the elastic qualities of the tire. The tread surfaces of the sections may be provided with longitudinally extending ribs 9, as seen in Fig. 2 of the drawings, or with transversely extending ribs 9$^a$, as seen in Figs. 4 and 5 of the drawings, to increase the traction of the protector. Arms 10, which project laterally and centrally from the longitudinal edges of the sections and form integral parts thereof, are bent to dispose their free ends in overlapped relation across the inner surface of the felly 4. The overlapped portions of the arms 10 are provided with elongated registering openings 11, through which project threaded bolts 12, said bolts engaging the felly 4 to retain the sections in applied position. The provision of the arms 10 with the elongated openings 11 permits the arms to yield laterally under the pressure of the lateral enlargement of that portion of the tire which bears the weight of the wheel, also to prevent the protector from detracting from the elastic qualities of the tire. The bolts 12 are headed and the heads are disposed sufficiently above the felly 4 to permit each section to have an inward movement relative to the felly 4. A shoe 13 is interposed between the tire 5 and the protector to prevent the movements of the sections of the protector from wearing the tire. The shoe may be constructed of leather, canvas, or any material suitable for the purpose.

An air pump barrel 14 is mounted in the tire 5 and has secured to its inner end an inwardly opening valve 15. A piston head 16 is mounted in the barrel 14 and is provided with a piston 17, the head 18 of which projects beyond the tire and is interposed between one of the sections of the protector and the tire to permit the inward movement of the section relative to the felly 4 to force the piston head 16 inward and thus force air into the tire. A spring 19 is located above the piston head 16 to retain the piston head 18 yieldingly projected.

After the section between which and the tire the piston 18 is located, is moved by the rotation of the wheel out of contact with the roadway, the spring 19 forces the piston head and said section outward to permit the operation of the pump when this section is again brought into engagement with the roadway. The provision of the tire with this pump provides means for replacing slow leakage of air from the tire and retains the tire in a normal condition.

From the foregoing description taken in connection with the accompanying drawings, the construction and mode of operation of the invention will be understood without a further extended description.

Changes in the form, proportions and minor details of construction may be made within the scope of the invention without departing from the spirit or sacrificing any of the advantages thereof.

Having fully described and illustrated my invention, what I claim is:

1. The combination with a wheel and a tire secured thereto, of a protector for the tire, said protector comprising sections, each of said sections consisting of a tread portion provided with a keeper and extended longitudinally to provide a tongue and laterally in both directions to provide arms, said arms being adapted to embrace the tire and felly, and fastening means for the arms.

2. The combination with a wheel and a tire secured thereto, of a protector for the tire, said protector comprising sections provided with arms disposed in overlapped relation across the inner surface of the felly, fastening means for the arms, and a pump located in the tire and having its piston projected beyond the tire and located within the protector.

In testimony whereof, I affix my signature in presence of two witnesses.

WILLIAM H. RICE.

Witnesses:
BLENDA R. SEABURG,
WILLIAM C. HICKS.